United States Patent
Woods

(10) Patent No.: US 6,454,570 B1
(45) Date of Patent: Sep. 24, 2002

(54) MONEY STORAGE DEVICE, SYSTEM AND METHOD OF OPERATING A BANK ACCOUNT AND BANK ACCOUNT

(75) Inventor: Sarah Woods, London (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/564,510

(22) Filed: May 4, 2000

(30) Foreign Application Priority Data

May 6, 1999 (GB) .............................. 9910513

(51) Int. Cl.[7] .............................................. G09B 19/18
(52) U.S. Cl. ...................................................... 434/107
(58) Field of Search ................................ 434/107, 109, 434/110; 235/379; 705/35, 39, 40, 42

(56) References Cited

U.S. PATENT DOCUMENTS

| | | |
|---|---|---|
| 3,313,477 A | 4/1967 | Brown |
| 3,992,805 A | 11/1976 | Arkin |
| 4,153,197 A | 5/1979 | Hall |
| 5,350,906 A * | 9/1994 | Brody .......................... 235/379 |
| 5,457,305 A * | 10/1995 | Akel ........................... 235/379 |
| 5,470,079 A * | 11/1995 | LeStrange ................ 273/138 A |
| 5,482,487 A | 1/1996 | Harris |
| 5,665,952 A * | 9/1997 | Ziarno ......................... 235/380 |
| 5,716,211 A | 2/1998 | Vetter |
| 5,954,576 A * | 9/1999 | Coulter ......................... 453/17 |
| 6,173,269 B1 * | 1/2001 | Soloki ........................... 705/35 |
| 6,308,887 B1 * | 10/2001 | Korman ...................... 235/379 |
| 6,318,536 B1 * | 11/2001 | Korman ...................... 194/217 |

FOREIGN PATENT DOCUMENTS

| | | |
|---|---|---|
| DE | 2607517 | 9/1977 |
| FR | 2335005 | 7/1997 |
| GB | 2255666 | 11/1992 |
| JP | 5719691 | 2/1982 |

* cited by examiner

*Primary Examiner*—Derris H. Banks
*Assistant Examiner*—Kurt Fernstrom
(74) *Attorney, Agent, or Firm*—George H. Gates

(57) ABSTRACT

An educational banking apparatus is provided comprising a compartment for storing money, an aperture to allow money to be deposited into apparatus and an outlet to allow money to be withdrawn from the apparatus, balance determination means for determining the amount of money stored in the apparatus and communication means to allow transmission of balance information over a network to a remote location. The apparatus may be in a form that appeals to children such as a piggy bank and allows a child to save and become familiar with the concept of a bank account without out having to physically part with his or her money.

17 Claims, 4 Drawing Sheets

MONEY STORAGE DEVICE, SYSTEM AND METHOD OF OPERATING A BANK ACCOUNT AND BANK ACCOUNT

BACKGROUND OF THE INVENTION

The present invention relates to a money storage device, system and method of operating a bank account and bank account.

In today's increasingly competitive banking environment simply providing high-quality banking services no longer guarantees customer loyalty. Customers will move their bank accounts to other providers in order to obtain improved service and/or various value-added features. However, evidence has also shown that when customers can be secured at a young age, there is at least a chance they will remain with a particular bank in future. Most major banks are currently trying to increase their profile, and number of account holders, amongst children.

While it is possible for a banking institution to provide accounts for children, there are a number of problems, particularly with very young children. Cognitive development tests have shown that children do not understand bank accounts until they obtain an understanding of quantities at about 8 years of age. Also, young children cannot generally be trusted with the means to access the bank's self-service network (i.e. a cash-withdrawal card) and so transactions have to occur within the branch. Not only is this very expensive (and often the transactions involve very small amounts) for the bank to provide but it will also increase congestion in the branches where older, more valuable customers may be frustrated by the delay caused by lengthy children's transactions. In addition, and perhaps most significantly, children do not wish to actually part with their money, even to a bank. As a child is unable to comprehend the concept of a bank account, he or she perceives that their money is being taken from them by the bank and will not be returned. Very young children may also find the bank branch boring, which will have a negative effect.

SUMMARY OF THE INVENTION

It is an object of the present invention to ameliorate the above disadvantages.

According to a first aspect of the present invention, there is provided an educational banking apparatus comprising a compartment for storing money, input means to allow money to be deposited into apparatus and output means to allow money to be removed from the apparatus, characterized by balance determination means for determining the amount of money stored in the apparatus and communications means to allow transfer of balance information to a remote location.

Although an account is held at a bank, the customer retains their money at their home within the apparatus, so there is no pressure on bank branch facilities. Neither does the young customer have to actually part with their money. By provision of a communications link between the apparatus and the remote bank at which the account is held, up-to-date account balance information can be held by the bank and the customer can receive, and become familiar with, "adult" banking paraphernalia such as statements received by post. Typically, the savings apparatus will be linked to the bank's computer on a regular basis, such as weekly, so that the mailed statements are up to date but connection may take place as and when a statement is desired. Alternatively, communication may take place in response to deposits to or withdrawals from the apparatus.

The communication link with the bank's computer may be via a number of different channels, but access via the Internet is preferred. In certain countries, it is now possible to obtain a connection to the Internet via the electricity supply. In this case, therefore, a single connection to a mains socket will provide power for the savings apparatus and the data-link with the bank's computer.

The balance determination means is preferably in the form of a weight sensor but more sophisticated techniques such as coin sensors may additionally or alternatively be used.

The savings apparatus is preferably in a form which appeals to children such as in the form of the traditional piggy-bank. Another preferred arrangement is that of a plurality of cylindrical tubes sized to each denomination of the relevant currency. By making the tubes transparent the customer can see exactly how much of each denomination of coin he/she has.

Further functionality may be provided in the storage device such as an alarm clock, a bedside lamp, sound effects, visual display effects and even an audio synthesizer which may, for example, be arranged to deliver appropriate messages to the young customer such as the playing of Happy Birthday to the customer on the relevant day. These additional features are designed to appeal to the younger customer and so promote the apparatus and its primary function, i.e., saving money to a child.

From another aspect, the invention may be defined as a system for operating a bank account comprising a banking institution, a savings storage device for storing money at a customer's location remote from the banking institution and communication means for communicating account information between the storage device and the remote banking institution.

In this system, the functionality available to the customer can be divided between the bank's computer and the savings storage apparatus itself. For example, the savings storage apparatus could be substantially "dumb", the signals generating capability of the apparatus (i.e. playing a happy tune when money is inserted) being made via the link to the bank's computer. A message would be sent from the device in response to each withdrawal or deposit. At the other extreme, the storage device could be provided with almost all of the required intelligence and be programmed only to send a new balance to the bank's computer periodically. Any mixture of functions between these two extremes is possible.

Accordingly from a third aspect of the present invention, there is provided a method of operating a bank account comprising providing the customer with a savings storage device to be kept at customer location remote from the account holding banking institution, communicating account balance information from the customer location to the banking institution over a communications network customer and sending the customer statements of account.

The account balance is preferably communicated to the banking institution at predetermined intervals but may also be communicated automatically in response to deposits to and withdrawals from the savings device.

The account is preferably opened for a child by a parent or guardian in the normal way.

Over time, if the account has been operated in a mature manner or other criteria have been met such as the balance reaching a certain value, the banking institution may wish to provide the customer with one or more further savings storage devices (a more sophisticated device or a family of devices) or other incentives so as to reward the customer.

This motivates the child to operate the account in a mature manner and encourages saving of money.

Expressed in another way, the invention resides in bank account in which funds are stored at the customer's location. As discussed above, such a system has advantages for both the banking institution (i.e. no drain on branch facilities) and for the young customer (i.e. he or she can retain their money at home but still hold a bank account)

It should be understood that by customer location is meant at a location chosen by the customer rather than physically with the customer at all times.

In due course, provided that the account has been operated responsibly, the account may mature into a more traditional one in which the funds are actually stored by the bank. A number of increasingly sophisticated accounts may thus be provided as the child grows older. This ensures that he does not get bored with the bank and is more likely to remain faithful to it in the longer term.

BRIEF DESCRIPTION OF THE DRAWINGS

Further features of the invention will be apparent from the following description, which is given by way of example, in conjunction with the accompanying drawings, in which.

DETAILED DESCRIPTION

Figure 1:
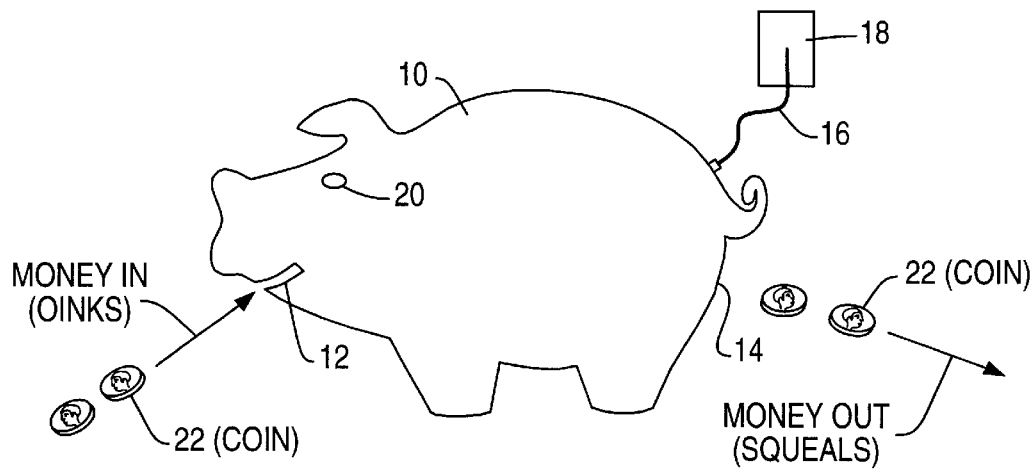
FIG. 1 shows a first educational savings storage device embodying the present invention.

FIG. 1 shows a storage device 10 in accordance with an embodiment of the invention. The device 10 is constructed to resemble a traditional piggy-bank. The device includes a money entry slot 12 and a money exit slot 14. The device may be connected to both the mains and the Internet via lead 16 and plug 18. The eyes 20 of the pig comprise light emitting diodes (LEDs) and the device includes a sound synthesizer (not shown). When money 22 is inserted into the slot 12 the sound synthesizer issues a happy or cheerful sound, such as an "OINK!" sound. The LEDs 20 may also flash in response to this event. When money is removed from the device via the slot 14, the sound synthesizer makes an unhappy or upset sound, such as a squeal. This combination of audible and visual signals impresses upon a child that saving money is a good thing.

The device also includes means (not shown) for maintaining a balance of the coinage currently stored within the device. In a preferred embodiment, this information is transmitted to the bank weekly. This ensures that the balance stored at the bank is reasonably current but does not cause undue overload of the banking computer's I/O (input/output) facilities. More, or less, frequent communication with the bank's computer is, of course, possible.

Figure 2:
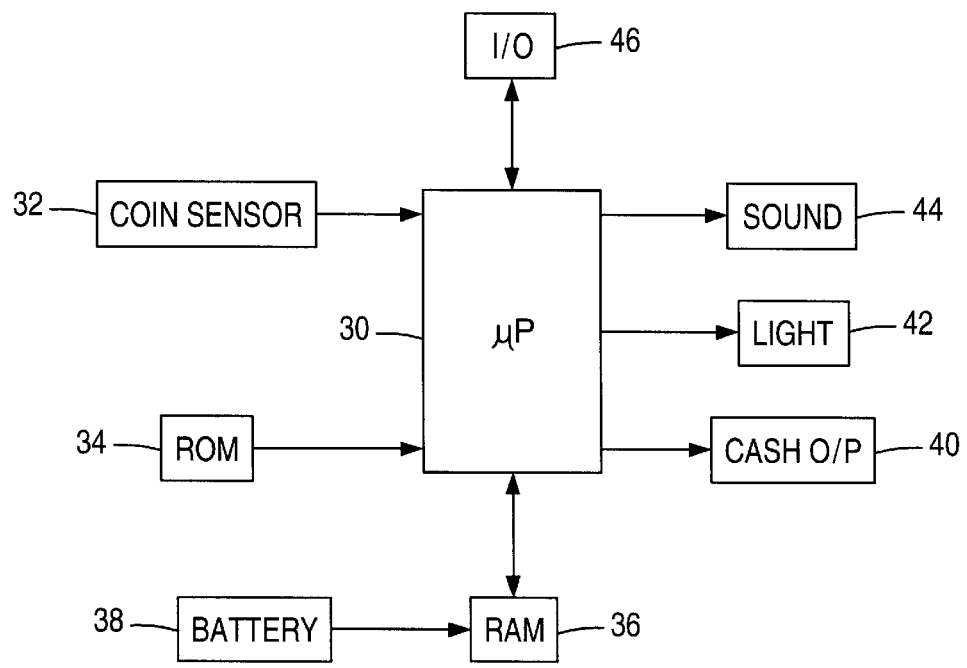
FIG. 2 shows a block schematic diagram of the device of FIG. 1.

FIG. 2 is a block schematic diagram of a device such as that shown in FIG. 1. A microprocessor 30 is connected to the following peripherals: a coin sensor 32, a read only memory (ROM) 34, a random access memory (RAM) 36 which retains at least some stored items when external power is removed, for example by having a battery back-up 38, a money dispensing circuit 40, a light controller 42, a sound circuit 44 and an input/output circuit (I/O) 46.

Means for measuring and dispensing cash are known, for example, from vending machine technology. As a potentially cheaper alternative, the device could be provided with a weight sensor to weigh the currency stored. When money is inserted the new weight minus the old weight (stored in RAM 36) gives the weight of the new coin whose value can then be determined. The opposite occurs in response to a withdrawal.

When a coin is inserted into the slot 12 (FIG. 1) the coin sensor 32 determines the value of the coin and transmits this to the microprocessor 30. The microprocessor reads the current balance from the RAM 36 and increases that balance by an amount corresponding to the value of the coin. The microprocessor also instructs the sound circuit 44 and the light controller 42 to provide positive, optimistic sounds and lighting effects respectively.

When it is desired to remove cash from the storage device the microprocessor activates the cash output circuit 40 which causes a coin or coins to issue from the slot 14 (FIG. 1). The microprocessor also instructs the sound circuit 44 and the light controller 42 to make negative, pessimistic sounds and lighting effects respectively. The light controller may generate patterns of lights, time-varying displays and even alter the color of the entire device. The light for the entire device could go out when the unit is devoid of money. The microprocessor reads the previous balance from the RAM 36 and reduces it by the value of the coin or coins dispensed. The microprocessor obtains its instructions from ROM 34 in known manner.

Internally, the device comprises a separate compartment for each denomination of coin. Entry to, and exit from these compartments may be by way of solenoid-controlled flaps or other suitable technique. In order to reduce the complexity of the device, it is preferred that the money storage and exit process occurs under gravity. This may necessitate the user re-orienting the device when inserting and/or recovering money.

In an alternative construction, the device contains a single compartment and weighing means. It determines the currency removed or inserted by means for the weight.

Periodically, either in response to a signal received via I/O circuit 46 or following a signal from an internal timer (not shown) the device will transmit the current balance stored in RAM 36 to the bank's computer via the I/O circuit 46. Again, any suitable communication technique/protocol may be used. The bank's computer increases or reduces the relevant balance in the same way as it would for a "normal" withdrawal or deposit communicated via electronic channels. The bank can then provide statements in the normal way. These are preferably provided in a more "friendly" format than is traditional. For example, the paper may be printed with a piggy logo, be piggy-shaped and/or be mailed in a piggy-shaped envelope. The bank can also provide the customer with a child-friendly folder in which to store the statements. The child will thus, hopefully, see their balance building up over time.

Figure 3:
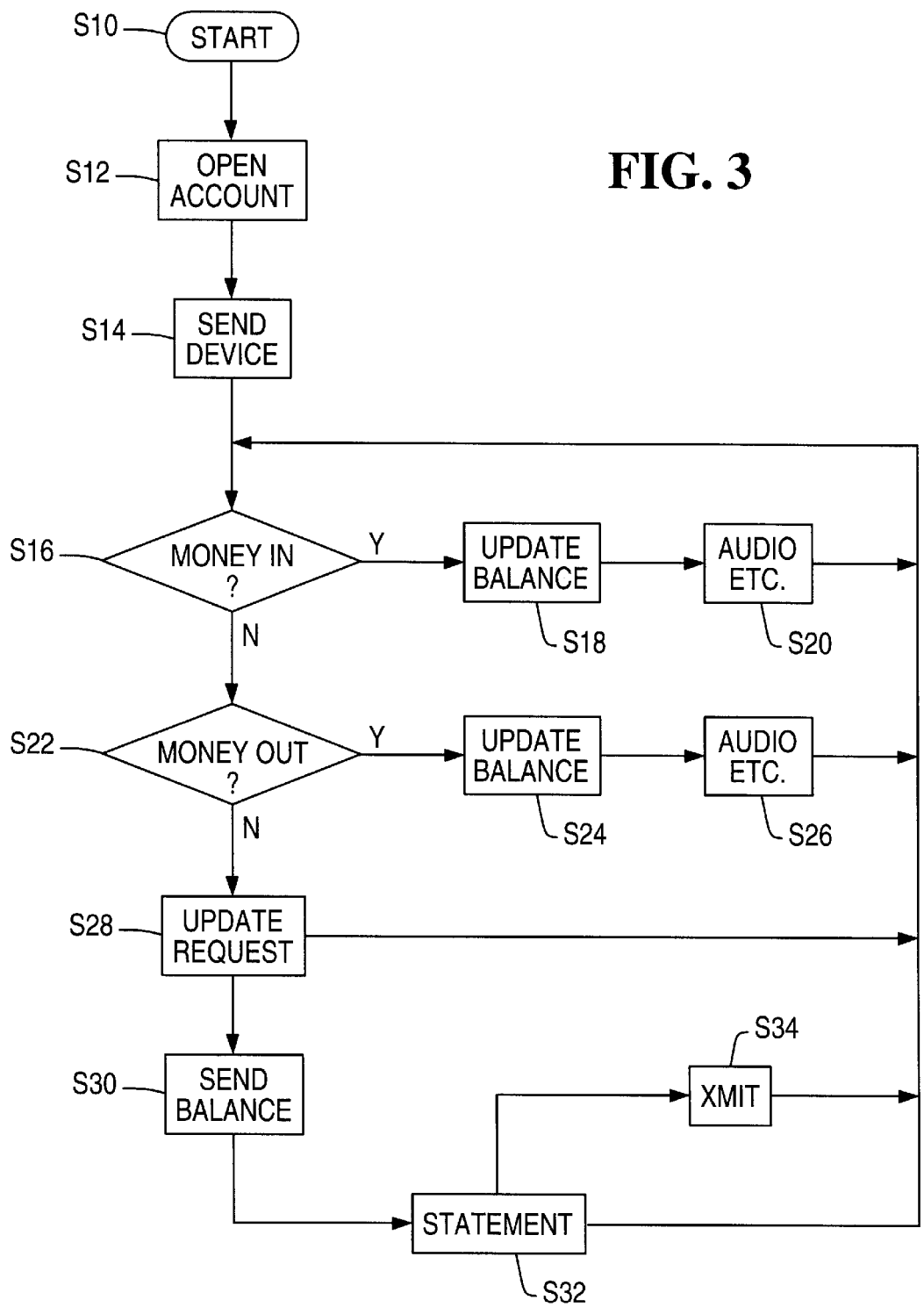
FIG. 3 shows a flow chart illustrating the operation of the device of FIG. 1.

FIG. 3 shows a diagram of a method in accordance with an embodiment of the invention. The method starts at step S10 and then proceeds to step S12 where an account is opened for a child. Typically a parent or guardian will open the account on the child's behalf. At step S14 the child is given the device and is instructed on how to use it. The child may also be given a folder in which to store statements. At step S16 the device determines whether money is being inserted. If yes, processing proceeds to step S18 at which the balance in the RAM (36, FIG. 2) is updated. Processing proceeds to step S20 at which the audio/visual consequences of a money deposit are activated and processing returns to step S16. Where money is not being inserted processing proceeds to step S22 where the device determines whether a money withdrawal is desired. If yes, then processing proceeds to step S24 at which money is dispensed and the balance in the RAM is updated. Processing then proceeds to step S26 at which the audio/visual consequences of a cash withdrawal are provided. Processing then returns to step S16. Where money is not being withdrawn at step S22, processing proceeds to step S28 where the unit determines whether a signal has been sent by the bank requesting a balance update. If not, then processing returns to step S16. If a balance update has been requested at step S28 then processing proceeds to step S30 where the device sends details of current balance to the banking institution. Processing then proceeds to step S32 at which the bank determines whether a statement is required. If yes, then processing proceeds to step S34 where a statement is printed and mailed. Processing then returns to step S16. If the bank determines, at step S32, that the statement is not required then processing returns to step S16, omitting step S34. The series of steps between S16 and S28 thus continues for all of the time that the device is operational.

Further savings incentives may be provided to the child. For example, attainment of a predetermined balance (such as $100) could result in the child receiving a larger device or an additional device. The additional device may be linked electronically to the first device and, preferably, results in a matching set, for example a daddy and mummy pig.

Figure 4:
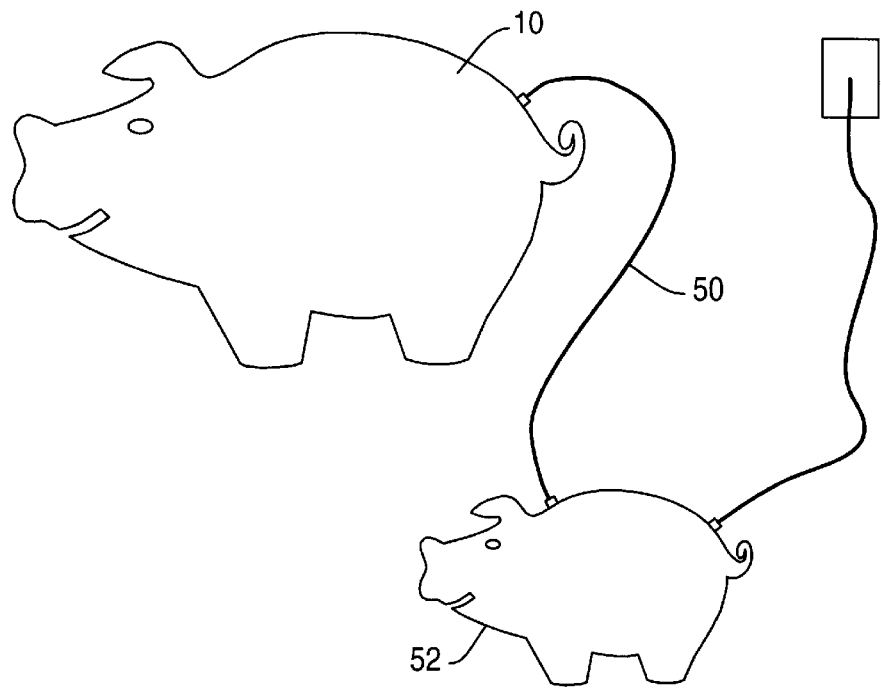
FIG. 4 shows a family of devices of the type illustrated in FIG. 1.

FIG. 4 shows a first piggy storage device 10 connected electronically at 50 to another such device 52. In this example, the additional storage device 52 is styled as a baby pig.

Figure 5:
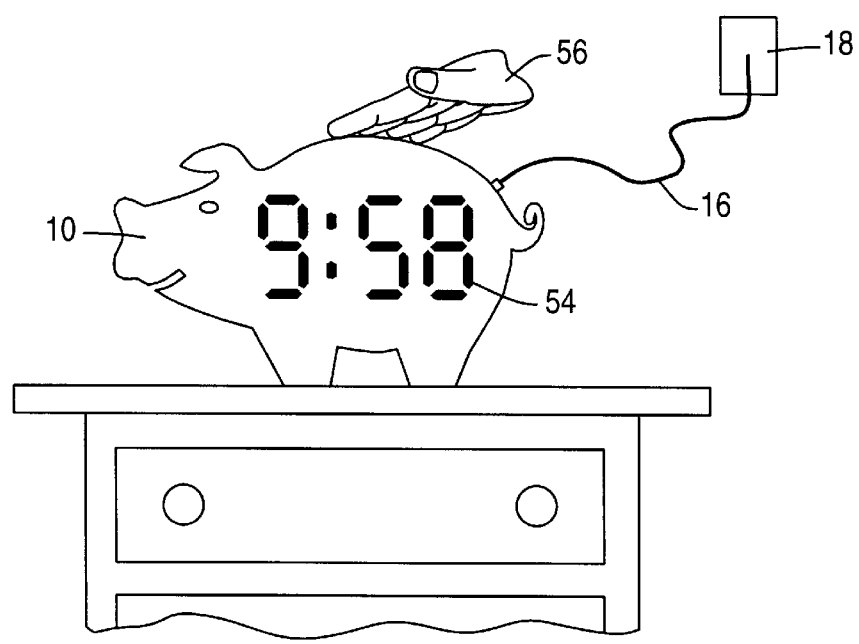
FIG. 5 shows the device of FIG. 1, incorporating additional functionality.

FIG. 5 shows a storage device of the type shown in FIGS. 1 and 4 with additional functionality, including a clock which displays the time at reference 54. The device also includes a lamp which may provide light either for reading and/or a somewhat dimmer light for use as a night-light. A user whose hand is shown at 56 may adjust the intensity of the light using any known technique. Preferably, however, the intensity of the light is adjusted by stroking the back of the pig. Stroking the pig in a first direction increases the light intensity, while stroking the pig in the opposite direction decreases the light intensity.

Figure 6:
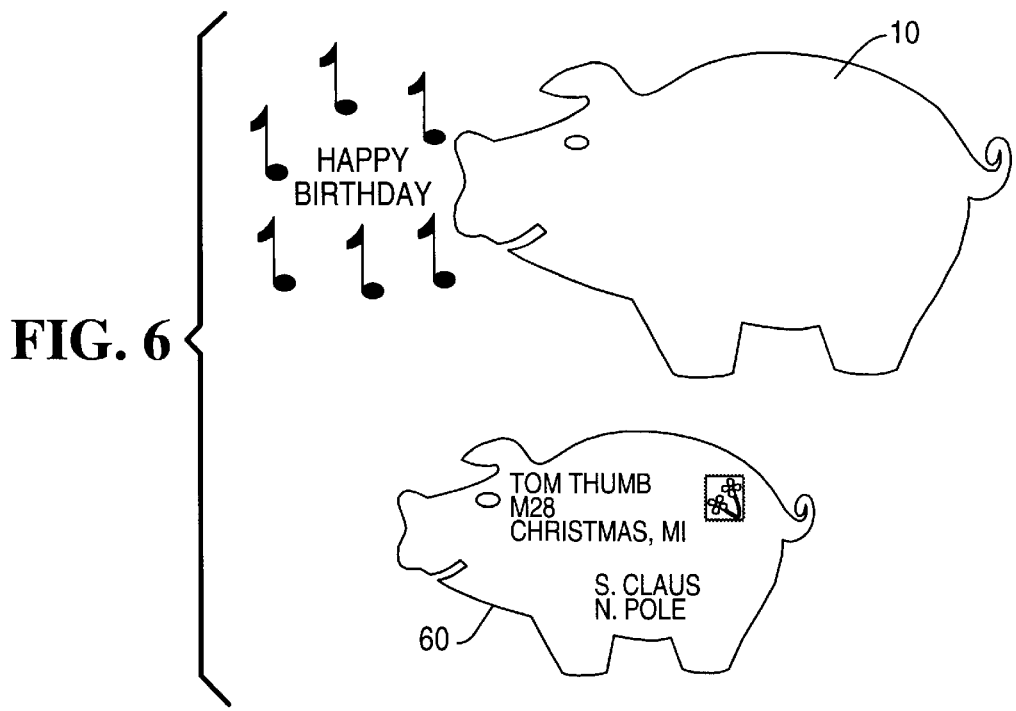
FIG. 6 shows the device of FIG. 1 incorporating further functionality.

FIG. 6 shows a device 10 which is singing Happy Birthday to its owner. This may be triggered by an internally-maintained calendar (not shown) or by an electronic message received via I/O 46 (FIG. 2) from the bank's computer (which will normally have access to a database which includes the child's birth-date). FIG. 6 also shows a postcard 60 which has automatically been mailed by the bank's computer a few days before the child's birthday, Christmas and so on. The card is a friendly shape, for example piggy-shaped to match the storage device 10.

Figure 7:
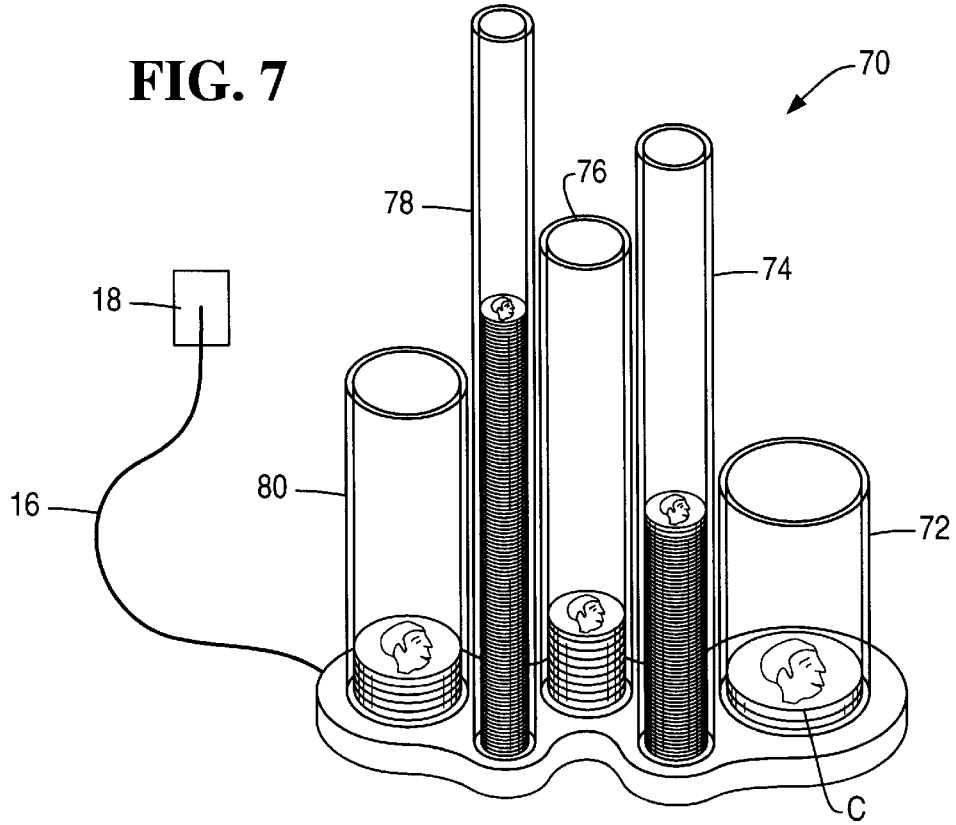
FIG. 7 shows a second savings storage device embodying the present invention.

FIG. 7 shows an alternative embodiment 70 of the storage device 10. The storage device 70 includes a number of vertical tubes 72, 74, 76, 78, 80. These five tubes have an internal diameter corresponding broadly to the external diameter of five denominations of coin. The coins C are visible through the transparent walls of the tubes. The child can thus physically count his money without actually removing it from the storage device 70. The device 70 has two main advantages over the device 10 previously described. Firstly, the child has to place the coins in the relevant tubes, thus helping to teach them the difference between coins having different values. Secondly, because the insertion of the coins into the relevant tubes is done by the user, there is no need for the coin distinguishing sensor (32, FIG. 2) which is required in a device having only one input slot. Money-sensing can be by way of a weighing device as described above.

What is claimed is:

1. An educational savings storage device comprising:
   a compartment for storing money designed for a customer to retain the money within the compartment at a location chosen by the customer for later retrieval by the customer;
   means defining an aperture to allow money to be deposited into the device by the customer;
   means defining an outlet to allow money to be withdrawn from the device by the customer;
   balance determination means for determining the amount of money stored in the device; and
   communication means for allowing transmission of balance information over a network to a remote location to apply to an account of the customer.

2. An educational savings storage device according to claim 1, wherein the balance information is transmitted via the Internet.

3. An educational savings storage device according to claim 2, wherein the means for communicating via the Internet comprises means for communicating to the Internet via a mains electricity supply.

4. An educational savings storage device according to claim 1, wherein balance information is transmitted to the remote location at predetermined intervals.

5. An educational savings storage device according to claim 1, wherein the balance determination means comprises a weight sensor.

6. An educational savings storage device according to claim 1, further comprising signal generating means for generating a first signal in response to the deposit of money into the device and generating a second signal in response to the withdrawal of money from the device.

7. An educational savings storage device according to claim 1, further comprising at least one of a sound synthesizer, a lamp, and a clock.

8. A system for operating a bank account, the system comprising:
   a banking institution; and
   a savings storage device for storing money at a customer location remote from the banking institution and including a balance determination means for determining the amount of money stored in the device and communication means for communicating account balance information between the savings storage device and the banking institution to apply to an account of the customer.

9. A system according to claim 8, wherein the savings storage device communicates deposit and withdrawal information to the banking institution.

10. A method of operating a bank account comprising:
    providing a customer with a savings storage device to be kept at a customer location remote from the account holding banking institution and including a balance determination means for determining the amount of money stored in the device and a communication means for communicating account balance information over a communications network;

communicating the account balance information from the customer location to the account holding banking institution over the communications network to apply to an account of the customer; and providing the customer with statements of account.

11. A method according to claim 10, wherein the account balance is communicated to the banking institution at predetermined intervals.

12. A method according to claim 10, wherein the account balance is communicated automatically in response to deposits to the savings storage device and withdrawals from the savings storage device.

13. A method according to claim 10, further comprising:
opening of an account for a child by a parent or guardian.

14. A method according to claim 10, further comprising:
providing the customer one or more incentives for operating the account in response to predetermined criteria having been met by the customer in the operation of the account.

15. The method of claim 14, wherein the predetermined criteria include attaining a predetermined balance.

16. The method of claim 14, wherein the one or more incentives include one or more additional storage savings devices.

17. The method of 16, wherein the one or more additional storage savings devices can be linked electronically to the storage device.

* * * * *